United States Patent [19]
Ueda et al.

[11] 3,854,850
[45] Dec. 17, 1974

[54] ROTARY MEANS FOR FORMING SOLID GRANULES FROM LIQUID SUPPLY MEANS

[75] Inventors: Kouzo Ueda, Kyoto; Zitumi Kimoto, Takarazuka, both of Japan

[73] Assignee: Osaka Gas Kabushiki Kaisha, Osaka, Japan

[22] Filed: Apr. 11, 1972

[21] Appl. No.: 242,926

[30] Foreign Application Priority Data
Apr. 14, 1971  Japan.............................. 46-24089

[52] U.S. Cl............................. 425/8, 264/8, 425/10
[51] Int. Cl............................................. B22d 23/08
[58] Field of Search.......................... 425/6–10, 222, 425/241; 264/5–8; 65/8, 15, 21

[56] References Cited
UNITED STATES PATENTS

| | | | |
|---|---|---|---|
| 684,979 | 10/1901 | Dithridge | 425/10 |
| 2,422,099 | 6/1947 | Hiller | 425/7 |
| 3,601,847 | 8/1971 | Uritskozo | 425/8 |
| 3,644,078 | 2/1972 | Tachibana et al. | 425/197 |

FOREIGN PATENTS OR APPLICATIONS

| | | | |
|---|---|---|---|
| 58,227 | 0/1913 | Austria | 425/6 |

*Primary Examiner*—Robert D. Baldwin
*Assistant Examiner*—John McQuade
*Attorney, Agent, or Firm*—Edwin E. Greigg

[57] ABSTRACT

The present invention provides a granulating apparatus, wherein a material which is solid at room temperature and becomes molten upon heating is heated to be melted, the resulting molten material is repeatedly caught little by little to be dropped, and the dropped molten material is cooled, whereby the molten material is formed into roundish granular solid bodies of suitable and substantially uniform size.

12 Claims, 21 Drawing Figures

PATENTED DEC 17 1974

ROTARY MEANS FOR FORMING SOLID GRANULES FROM LIQUID SUPPLY MEANS

BACKGROUND OF THE INVENTION

Generally, there have been attempts to form a material which is solid at room temperature and becomes molten upon heating, such as pitch or asphalt, into small granular solid bodies. This is because forming the material into small granular solid bodies provides many advantages. Thus, it facilitates the handling of the material, e.g., transport and storage thereof, and makes it possible to prevent the occurrence of a public pollution due to the scattering of dust during said handling. Moreover, it makes an additional crushing process unnecessary when such granulated material is used as a raw material for various uses.

The following means for granulating said material have been employed or proposed, but none of them is fully satisfactory as described below, accordingly there is a strong demand for the development of a more effective means.

Thus,

1. In the case where said material is softened and extruded into a slender form, which is then cut into short lengths, a working space which is large in relation to the processing capacity is required and moreover the apparatus itself is expensive and unsuitable for economical mass-production of said granular solid bodies. Further, the resulting granular solid bodies are cornered, having the disadvantage of tending to be powdered during subsequent handling.

2. In the case where said material is melted and poured into metal molds and thereby formed into granular solid bodies, this is unsuitable for economical mass-production of said granular solid bodies in that it is not only a high cost incurred by the molds but also expensive equipment or much labor is required for the handling of the molds.

3. In the case where said material is softened and extruded into a bar-like soft form, which is then cooled in the water to set and is finally cut into pieces, the bar-like soft body deforms into a hollow tubular form since the setting thereof begins at the outer periphery of the body in the process of cooling. Therefore, the solid cut into pieces contain water in the hollow portions thereof, so that the moisture content may be very high. Moreover, the cut pieces have sharp edges around the cut surfaces thereof, said sharp edges tending crumble into dust during transport of the pieces, thus having the disadvantage of causing a public pollution due to dust.

4. In the case where said material is melted and sprayed in the air, the resulting granular solid bodies are all very small, thus failing to attain the purpose of dust prevention. Further, this process is found unsuitable for continuous production of said granules, a necessary condition for mass-production, since the spraying nozzle in such operation soon becomes chocked up due to the bonding of the material to be sprayed.

SUMMARY OF THE INVENTION

The present invention relates to a granulating apparatus whereby a material which is solid at room temperature and becomes molten upon heating is formed into relatively even-grained roundish solid bodies of desired size.

According to the granulating apparatus of the invention, said material is stored in its molten state at a substantially constant temperature with the liquid level thereof kept substantially constant, said stored molten material being caught by successive relatively small amounts by means repeatedly moving on a substantially constant path, said caught molten material being dropped from the means, and said dropped molten material being cooled.

When the molten material is caught by said means, the amount of molten material to be caught is determined by various factors, including (a) the viscosity of the molten material, (b) the depth of penetration of the molten material withdrawing means into the stored molten material, (c) the adhesion force between said means and the molten material, and (d) the shape of said means.

In the present invention, since the temperature of the stored molten material is kept substantially constant, the condition (a) becomes substantially constant and since said means is repeatedly moved on the substantially constant path, the condition (b) also becomes substantially constant. Further, the conditions (c) and (d) can be easily made constant by suitably adjusting said means. In the invention, therefore, the amount of molten material to be caught by said means can be set substantially at a desired volume and can always be made substantially constant.

When the molten material caught by said means is dropped, the amount of molten material to be dropped can be adjusted by adjusting said conditions (a), (b), (c) and (d) and additional new conditions, that is, (e) the gravity acting on the molten material sticking to said molten material catching means and (f) the external force resulting from the movement of said means and tending to separate said molten material from said means.

In the invention, since the conditions (a), (b), (c) and (d) can be made constant as described above and the amount of molten material to be caught by said means can be made substantially constant as described above, the condition (e) becomes substantially constant. Further, since said means moves at a substantially constant speed on a substantially constant path, the condition (f) also becomes substantially constant. Therefore, the amount of molten material to be dropped from said means can be maintained substantially constant. The droplets of molten material are rendered spherical or substantially spherical by the action of the surface tension thereon during the time they are cooled until solidified.

In short, according to the invention, said material can be formed into commercially very useful evengrained roundish granular solid bodies of any desired size in a very easy and reliable manner. Further, in the invention since such roundish solid bodies are formed directly of said molten material, there is no possibility of dust creation in the process of granulation, thus providing high yields of the solid bodies. Further, by virtue of the fact that the resulting granular solid bodies are not cornered, there is almost no tendency for them to crumble into dust even during subsequent handling such as transportation and storage, thereby preventing the origination of dust and minimizing the loss of the material. Further, the handling and treatment, such as drying of the granular solid bodies are easy. Further, since the granular solid bodies are roundish and do not contain fine powder, the moisture content is low, and since they are of suitable size and relatively uniform size, it follows that when the granular solid bodies are used as a raw material for various uses, the weight of the granular solid bodies can be measured by the volume thereof, and there is no adhesion among the granular solid bodies because the area of the osculating plane among the granular solid bodies is limited.

Particularly, the invention enables mass-production to be realized with a very simple and small-sized apparatus, such apparatus having a remarkable advantage in that it will not break down even if it is continuously run for a prolonged period of time. Thus, such apparatus may be a smallsized inexpensive one, constituted by very simple mechanisms, comprising a vessel for storing said molten material, simple means such as an arm for withdrawing the molten material from the vessel, simple means such as a water tank for cooling droplets of said molten material, and other means.

An object of the invention is to provide an apparatus for granulating a material which is solid at room temperature and becomes molten upon heating.

Another object of the invention is to provide an apparatus capable of the reliable production of commercially very useful roundish solid bodies of suitable and substantially uniform size.

A further object of the invention is to provide a granulating apparatus which is superior in that no dust is created during granulating operation and during subsequent handling, so that problems of public hazard and of environmental hygiene can be positively solved.

An important object of the invention is to provide a granulating apparatus which is very superior in economy and productivity and which are capable of reliably mass-producing said granular solid bodies without requiring expensive means or much labor.

DESCRIPTION OF THE PREFERRED EMBODIMENT

Figure 1:
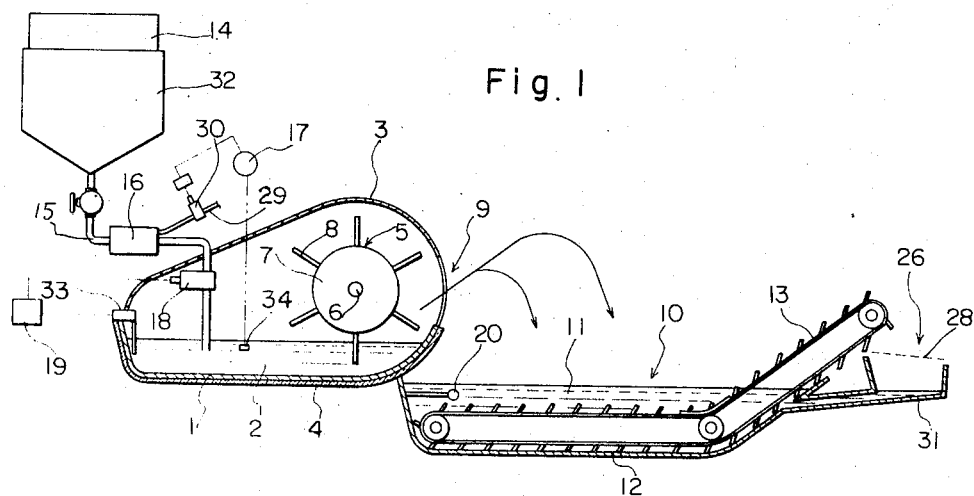
FIG. 1 is a schematic side view, partly in section, showing a granulating apparatus.
Figure 2A:
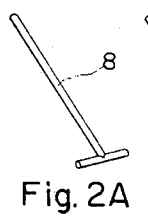
FIGS. 2A-2Q are a schematic perspective views showing examples of means for catching molten material.
Figure 2B:
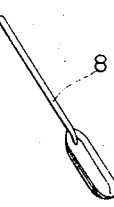
Figure 2C:
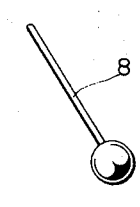
Figure 2D:
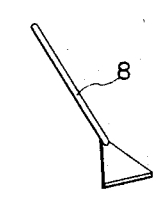
Figure 2E:
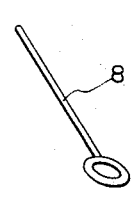
Figure 2F:
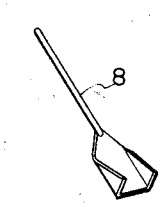
Figure 2G:
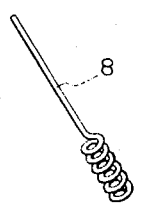
Figure 2H:
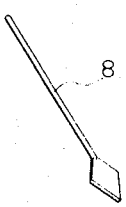
Figure 2I:
Figure 2J:
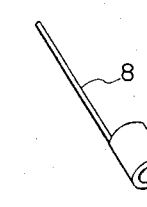
Figure 2K:
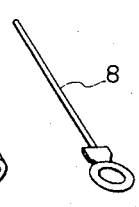
Figure 2L:
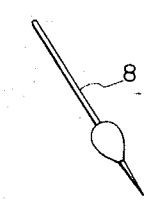
Figure 2M:
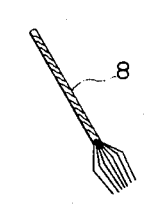
Figure 2N:
Figure 2O:
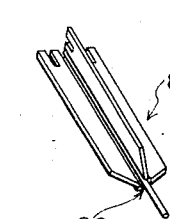
Figure 2P:
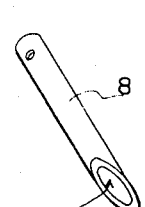
Figure 2Q:
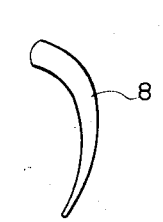

In FIG. 1, the numeral 1 designates a vessel, in which a material 2, which is solid at room temperature and becomes molten upon heating, is stored in its molten state. The vessel 1 is covered with a cover 3 to prevent the dissipation of heat from the molten material stored in the vessel, and the vessel 1 and cover 3 are provided with a heat insulator 4, whereby the temperature of the material 2 stored in the vessel 1 is kept substantially constant. The numeral 5 designates means for catching the molten material 2 from the vessel 1 by relatively small respectively and substantially equal amounts and dropping said molten material by successive substantially equal amounts, said means comprising a number of arms 8 implanted around the outer periphery of a rotary body 7 power-driven for rotation around the axis of a shaft 6 at a uniform speed, said arms 8 being repeatedly moved in substantially constant path. The molten material 2 dropped by the action of the centrifugal force resulting from the rotation of the arms 8 is fed into cooling means 10 through an opening 9 in the cover 3. The cooling means 10 is in the form of a tank 12 containing a body of water 11. The drops of molten material 2 from the arms 8 are made spherical or substantially spherical by the action of the surface tension thereon until they are solidified by the cooling. Therefore, the granular solid bodies of the material 2 cooled and solidified in the tank 12 are roundish ones of suitable and substantially uniform size. The numeral 13 designates means for withdrawing the granulated solid bodies from the tank 12, said means 13 being desirably a slurry pump. The numeral 26 designates means whereby the water 11 and granulated solid bodies concurrently withdrawn by the catching means 13 are separated from each other. The means 26 consists, e.g., of a wire mesh or vibrating screen 28 and means 31 for returning the water 11 to the tank 12. The numeral 14 designates a tank for storing the the material 2 in its molten state, the arrangement being such that the molten material 2 is automatically fed from the tank 14 into the vessel 1. The numeral 16 designates a heat exchanger controlled by a temperature regulator 17 adapted to adjust the degree of opening of the valve 30 of a steam pipe 29 in accordance with a signal from a temperature detector 34. The heat exchanger 16 and temperature regulator 17 cooperate with each other whereby the temperature of the molten material 2 fed from the tank 14 into the vessel 1 is automatically changed in accordance with the temperature of the molten material 2 in the vessel 1 in order to maintain the temperature of the molten material 2 in the vessel 1 substantially constant. A heat exchanger may be placed in the molten material 2 in the vessel 1 to control the temperature of said material 2. The numeral 18 designates a control valve controlled by a liquid level regulator 19 adapted to be actuated in accordance with a signal from a liquid level detector 33. Thus, the control valve 18, liquid level regulator 19 and liquid level detector 33 constitute a liquid level regulating mechanism by which the amount of molten material 2 to be fed from the tank 14 into the vessel 1 is automatically changed in accordance with the liquid level in the vessel 1, thereby maintaining the liquid level in the vessel 1 substantially constant. The numeral 20 designates a heat exchanger serving to control the temperature of the water 11 in the cooling tank 12 and the numeral 32 designates a heat insulator for the maintenance of the temperature in the tank 14. The material 2, which are solid at room temperature and become molten upon heating, include pitch, asphalt, glass, synthetic high molecular compounds, fertilizers such as urea, millet jelly, etc. Other materials may also be made the subject of the invention.

As for the shape of said arm 8, various forms may be employed as illustrated in FIG. 2, it being noted that said shape influences the size, shape and granule size distribution of granulated solid bodies to be obtained. Therefore, it is desirable that the shape of the portion of the arm 8 which penetrates the molten material 2 be such that it is capable of catching a suitable amount of molten material 2, that the molten material 2 caught by the arm 8 easily gathers at the front end of the arm 8 before it is dropped from the arm 8 and that the dropped molten material 2 is easily rendered spherical by the action of the surface tension thereon without being split off. From such viewpoint, those forms of arm 8 which are indicated at (B), (C), (E), (H), (I) and (L) in FIG. 2 are desirable, and proferably, such as (L), the portion of the arm 8 which will dip into the molten material 2 may be in shape having a thin portion at the front and a thick portion at the root. In the forms of arm 8 which are indicated at (A), (C), (D) and etc. in FIG. 2, said catching the molten material is caused by adhesion between the molten material in the vessel and each the arms 8 dipped thereinto.

Figure 3:
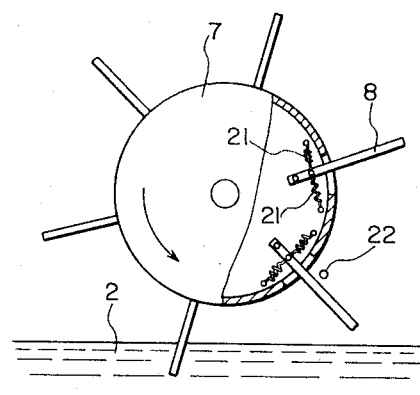
FIGS. 3 and 4 are sectional views showing driving mechanisms for molten material catching means.

As shown in FIG. 3, arms 8 are attached to a rotary body 7 in such a manner as to be swingable in the direction of rotation of the rotary body 7, and a suitable number of springs 21 are attached in order to maintain the position of the arms 8 normally fixed with respect to the rotary body 7. A stopper 22 is provided which functions to swing the arms 8 rearwardly as viewed from the direction of rotation against the forces of the springs 21 and thereafter elastically displaces to release the arms 8. Thus, if the molten material 2 is dropped from the arms 8 by means of the combined motion of the rotation and swing of the arms 8, it is possible to decrease the speed at which the arms 8 penetrate the molten material 2 and increase the speed of the arms 8 when the molten material 2 is dropped from the arms 8, thereby preventing the molten material 2 from being scattered when the arms 8 dip into the molten material 2 and ensuring that the molten material 2 will be dropped from the arms 8 by successive fixed amounts. Therefore, even-grained granular solid bodies of the material 2 will be conveniently obtained without any possibility of causing the loss of material 2 or environmental pollution.

Figure 4:
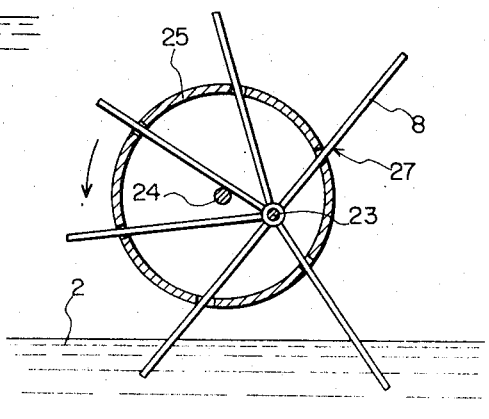

Further, as shown in FIG. 4, a driving mechanism for changing the speed of arms 8 may be constructed in a manner similar to the one shown in FIG. 3, which comprises arms 8 rotatable around the axis of a shaft 23, a drum 25 power-driven for rotation around the axis of a shaft 24 which is in parallel spaced relation to said shaft 23, said shaft 23 being positioned inside the drum 25, said shaft 24 lying out of the rotational locus area of the arm 8, said arms 8 being telescopically inserted in openings 27 in the peripheral wall of the drum 25. Thus, with rotation of the arms 8 effected by driving the drum 25 at a constant speed, when the arms 8 dip into the molten material 2 in the vessel 1, the amount of projection of the arms 8 out of the outer peripheral surface of the drum 25 is small whereas it is large when the molten material 2 is dropped from the arms 8.

Therefore, the speed of the arms 8 is higher at the time of dropping than at the time of penetration.

It is convenient for mass-production that said arms 8 may be arranged with space in the direction of the rotational axis of said drum 7 or said shaft 23.

In order to repeatedly power-drive the arms 8, besides rotation use may be made of rectilinear motion, swing motion, zigzag motion, or combinations thereof. Further, such motion may be either continuous or intermittent.

Conveniently, heating means may be provided for elevating the temperature of the arms 8 to or a little above the temperature of the molten material 2 to decrease the bonding of the molten material 2 to the arms 8. Further, the shaft, may be positioned vertial or substantially vertical with the arms 8 attached to the lower end thereof, thereby decreasing the bonding of the molten material 2 to the arms 8 and shaft 23.

The tank 12 may contain other liquid than water, which will not dissolve the material 2. Further, the tank 12 filled with a liquid may be replaced by a cooled steel belt or other means.

The following is the experiment result concerning a granulating apparatus and a granulating process according to the invention.

Figure 5:
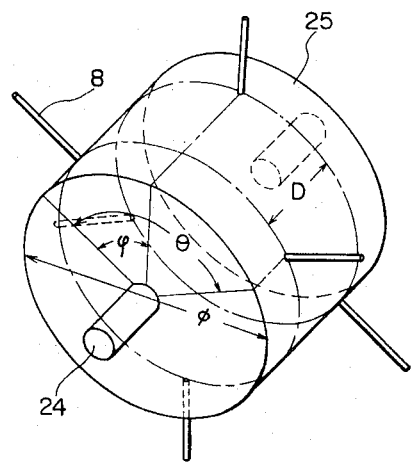
FIG. 5 is a schematic perspective view showing a molten material catching means used in an experiment.

In this experiment, the means for catching and dropping the molten material 2, as shown in FIG. 5, comprised a drum 25 with a diameter $\phi$ of 80 mm having six arms 8 implanted in two rows, the distance D between the rows along the axis of a shaft 24 being 50mm, each row having three arms, the phase angle $\theta$ between adjacent arms 8 in the same row being 120°, the phase angle between arms in different rows being 60°. The material 2 used was pitch with a softening point of 80°C, and the temperature of the cooling water was 20° - 30°C. With the conditions, i.e., (a) the shape of the arms 8, (b) the rotational speed of the drum 25, (c) the temperature of the material 2, etc. changed, the processing capacity and the granulesize distribution of the granular solid bodies of the material 2 were measured. The result of measurement is shown in Table 1. The symbols representing the shapes of the arms 8 correspond to those shown in FIG. 2.

Table 1

| Shape of Arm | Retational speed of drum (r.p.m.) | Pitch temp. (°C) | Amount of pitch processed (g/min) | Granula size distribution (%) | | | | |
|---|---|---|---|---|---|---|---|---|
| | | | | above 9.5mm | 9.5–4.5mm | 4.8–2.0mm | 2.0–1.0mm | below 1.0mm |
| A | 100 | 160 | 80 | 2 | 36 | 57 | 4 | 1 |
| A | 100 | 200 | 50 | 1 | 5 | 71 | 21 | 2 |
| B | 116 | 180 | 250 | 3 | 72 | 24 | 1 | 0 |
| C | 150 | 180 | 146 | 0.4 | 18 | 73 | 7 | 1 |
| C | 200 | 180 | 360 | 2 | 34 | 60 | 5 | 0 |
| L | 120 | 180 | — | 3 | 35 | 59 | 3 | 0 |
| D | 100 | 180 | 958 | 30 | 58 | 12 | 1 | 0 |
| E | 100 | 180 | 65 | 0 | 5 | 73 | 22 | 1 |
| G | 100 | 180 | — | 2 | 68 | 28 | 2 | 0 |
| H | 150 | 180 | — | 0 | 15 | 82 | 3 | 0 |
| J | 160 | 180 | — | 0 | 7 | 89 | 4 | 0 |

From the result shown in Table 1 it is seen that the selection of processing capacity and granule size can be freely made by suitably presetting said conditions (a) – (c). Further, it is also seen that regardless of the presetting of processing capacity and granule size, it is possible to obtain relatively even-grained granular solid bodies. Our investigation has revealed that the granular solid bodies are all very roundish.

What we claim is:

1. An apparatus for reducing molten material to substantially uniform granular form comprising a supply means of meltable material, means for maintaining the meltable material at a predetermined flowable temperature, conduit means associated with said last-named means for transporting the flowable material to a bath in a substantially closed chamber, rotary means positioned in said chamber, a plurality of pin members extending radially from said rotary means and having respective end portions thereof operatively positioned for scooping up limited, substantial uniform, separate portions of said molten material from said bath and for flinging off separately said limited portions of molten material scooped up through space and thence into a trough-like member positioned adjacent to said chamber, a coolant in said trough-like member for cooling said portions of material to solidify same in form of substantially uniform spheres, and means for advancing the granular material through said coolant to a means for separating the granules from the coolant, whereby the granules of substantially uniform diameter and relatively large size are produced.

2. An apparatus as claimed in claim 1, in which the pin members are disposed in staggered relation in alternate rows.

3. An apparatus as claimed in claim 1, in which said means for separating the granules from the coolant is a vibratory screen.

4. An apparatus as claimed in claim 1, further comprising control means for maintaining the flowable material fed to said bath substantially at a predetermined substantially constant level therein.

5. An apparatus as claimed in claim 1, further including heat exchanger means for maintaining the flowable material at a substantially constant temperature.

6. An apparatus as claimed in claim 4, in which said pin members have a shank portion for association with said rotary means and a modified terminal end portion.

7. An apparatus as claimed in claim 6, in which each said pin member is thin in a shank portion for association with said rotary means and is thicker in a modified terminal end portion than in said shank portion.

8. An apparatus as claimed in claim 1 wherein said pin members project from an outside surface of a peripheral wall of said rotary means driven for rotation around its horizontal axis.

9. An apparatus as claimed in claim 1, further comprising a shaft for rotating said rotary means, and wherein said pin members are arranged substantially perpendicular to the axis of rotation of said shaft.

10. An apparatus as claimed in claim 1 having a driving mechanism for driving said pin members while changing their speed in such a manner that when they dip into the molten material in said bath they are moving at a relatively low speed but when the molten material is flung off by said pin members they are moving at a relatively high speed.

11. An apparatus as claimed in claim 10 wherein said driving mechanism for changing speed of said pin members comprises a rotary drum driven at a constant speed and having said pin members attached thereto so as to be swingable in the direction of rotation, a suitable number of springs for maintaining the position of said pin members normally fixed, an abutment means which, prior to the flinging off of the molten material, temporarily delays rotation of each of said pin members in turn against the forces of said springs and then releases said pin members.

12. An apparatus as claimed in claim 10 wherein said driving mechanism for changing speed of said pin members comprises a drum having a central axis of rotation, and containing a shaft co-directionally spaced from said axis of rotation mounting said pin members, said drum driven at a constant rotational speed, said pin members being telescopically inserted in openings in a peripheral wall of said drum, whereby as said pin members are rotated, the length of projection of said pin members outwardly of the drum is changed.

* * * * *